(12) United States Patent
Honeck et al.

(10) Patent No.: US 10,814,487 B2
(45) Date of Patent: Oct. 27, 2020

(54) COMMUNICATIVE SELF-GUIDING AUTOMATION

(71) Applicant: Disney Enterprises, Inc., Burbank, CA (US)

(72) Inventors: Michael R. Honeck, Glendale, CA (US); Shelley O. Short, Altadena, CA (US); Jerry Rees, Glendale, CA (US); Kyle G. Freeman, Agoura, CA (US); Cory J. Rouse, Glendale, CA (US); Jeremy A. Mika, Burbank, CA (US); Michael Fusco, Alhambra, CA (US)

(73) Assignee: Disney Enterprises, Inc., Burbank, CA (US)

( * ) Notice: Subject to any disclaimer, the term of this patent is extended or adjusted under 35 U.S.C. 154(b) by 339 days.

(21) Appl. No.: 15/877,192

(22) Filed: Jan. 22, 2018

(65) Prior Publication Data
US 2019/0224850 A1    Jul. 25, 2019

(51) Int. Cl.
*B25J 9/16* (2006.01)
*H04W 4/38* (2018.01)
(Continued)

(52) U.S. Cl.
CPC .......... *B25J 9/1676* (2013.01); *B25J 9/1679* (2013.01); *H04W 4/024* (2018.02); *H04W 4/33* (2018.02); *H04W 4/38* (2018.02); *G06K 9/00362* (2013.01)

(58) Field of Classification Search
CPC ........ B25J 9/1676; B25J 9/1679; B25J 9/162; H04W 4/33; H04W 4/38; H04W 4/024; H04W 12/00508; G06K 9/00362; G06K 9/00389; A61B 2017/00207; B60K 2370/146; B60K 2370/1464; B60K 2370/1468; B60K 2370/1472; G05B 2219/36418; G05B 2219/23021; G05B 2219/35444; G06F 2200/1636;
(Continued)

(56) References Cited

U.S. PATENT DOCUMENTS

| 7,593,552 B2 * | 9/2009 | Higaki | G06F 3/017 |
| | | | 382/103 |
| 7,702,420 B2 * | 4/2010 | Goto | G05D 1/0246 |
| | | | 700/247 |

(Continued)

*Primary Examiner* — Abby Y Lin
*Assistant Examiner* — George Sun
(74) *Attorney, Agent, or Firm* — Farjami & Farjami LLP

(57) ABSTRACT

A self-guiding automaton includes sensors, a hardware processor, and a memory storing a self-guidance software code. The hardware processor executes the self-guidance software code to detect a location and/or travel path of one or more human being(s) in a pedestrian environment using the sensors, and identify a self-guided path forward in the pedestrian environment based on the location and/or travel path of each human being(s). The self-guidance software code also determines a social cue for communicating the self-guided path forward to the human being(s), detects any change in the location and/or travel path of each human being(s) using the sensors, determines a pedestrian safety score of the self-guided path forward based on the location and/or travel path and any change in the location and/or travel path of each human being(s), and moves the automaton along the self-guided path forward if the pedestrian safety score satisfies a safety threshold.

20 Claims, 5 Drawing Sheets

(51) Int. Cl.
*H04W 4/33* (2018.01)
*H04W 4/024* (2018.01)
*G06K 9/00* (2006.01)

(58) Field of Classification Search
CPC ............ G06F 3/017; G06F 2203/0381; G10H 2220/401; H04N 1/00381; G05D 1/0214; G10L 15/1815
See application file for complete search history.

(56) References Cited

U.S. PATENT DOCUMENTS

| | | | | |
|---|---|---|---|---|
| 7,826,925 | B2* | 11/2010 | Shishido | B25J 19/0091 |
| | | | | 700/245 |
| 8,406,925 | B2* | 3/2013 | Sarvadevabhatla | B25J 9/1602 |
| | | | | 700/259 |
| 9,776,323 | B2* | 10/2017 | O'Sullivan | B25J 9/1666 |
| 10,357,881 | B2* | 7/2019 | Faridi | H04N 5/23219 |
| 2007/0192910 | A1* | 8/2007 | Vu | G05D 1/0274 |
| | | | | 700/245 |
| 2013/0078600 | A1* | 3/2013 | Fischer | G09B 19/00 |
| | | | | 434/236 |
| 2013/0103196 | A1* | 4/2013 | Monceaux | A63H 11/18 |
| | | | | 700/253 |
| 2016/0363935 | A1* | 12/2016 | Shuster | G08G 1/0175 |
| 2017/0190051 | A1* | 7/2017 | O'Sullivan | G06N 20/00 |
| 2017/0213145 | A1* | 7/2017 | Pathak | G06N 5/04 |
| 2017/0287146 | A1* | 10/2017 | Pathak | G06T 7/0016 |
| 2018/0229372 | A1* | 8/2018 | Breazeal | B25J 11/001 |
| 2019/0193280 | A1* | 6/2019 | Mendelsohn | B25J 13/00 |
| 2019/0224853 | A1* | 7/2019 | Gewecke | B25J 11/0015 |
| 2019/0248014 | A1* | 8/2019 | Deyle | B25J 9/0003 |
| 2019/0366557 | A1* | 12/2019 | Gewickey | B25J 11/0005 |

* cited by examiner

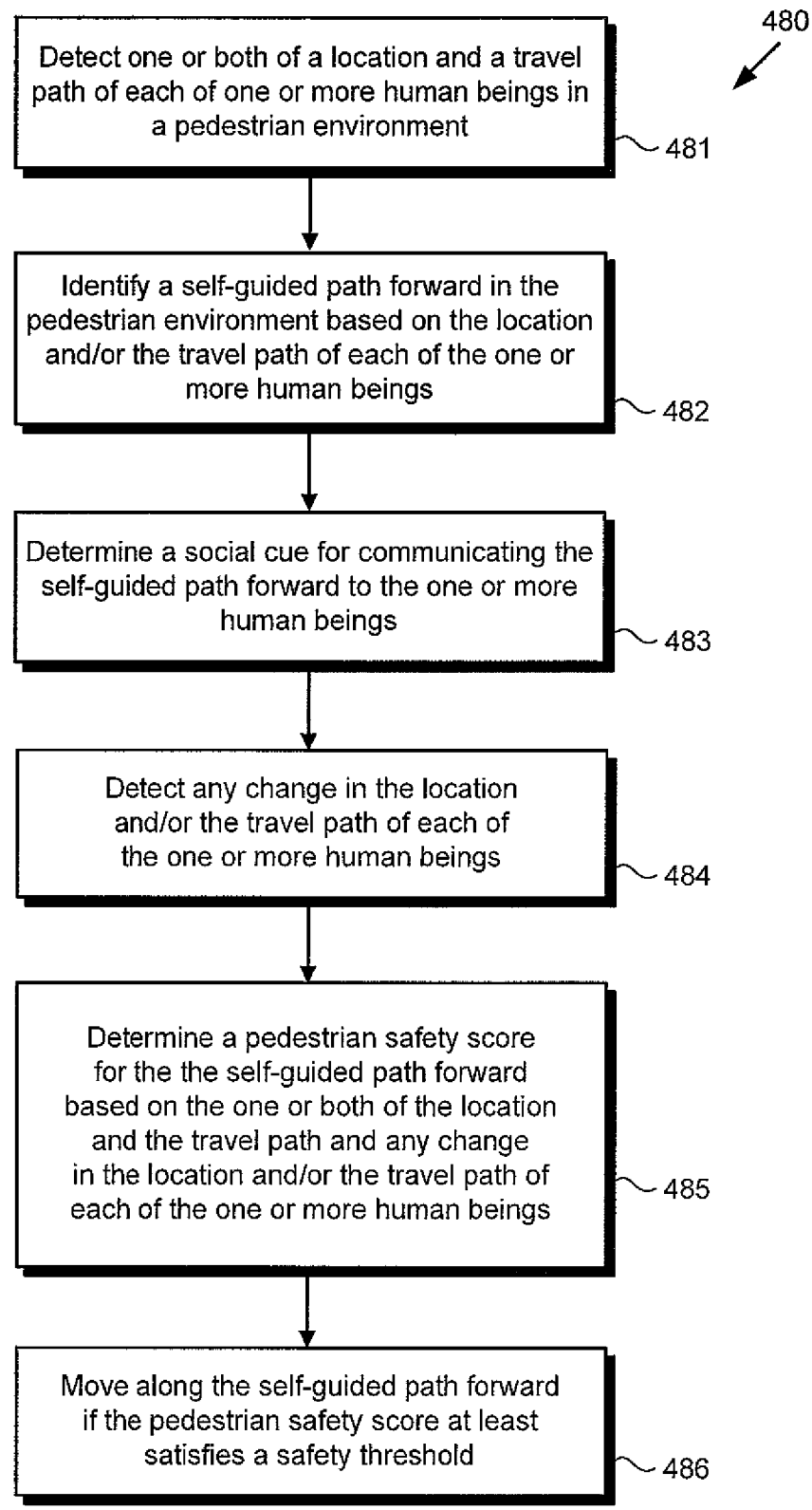

ical environment. Minor errors or miscalculations in route selection in environments shared by other vehicles may result in injury to an occupant of a vehicle involved in a collision, but are more likely to result in property damage. By contrast, and as also stated above, in pedestrian environments in which an autonomous vehicle navigates a space shared by human beings on foot, the consequences of even a minor miscalculation could result in serious injury or death.

COMMUNICATIVE SELF-GUIDING AUTOMATION

BACKGROUND

Autonomous vehicles, such as robots and self-driving cars for example, may analyze their environment to determine safe paths for future motion. Moreover, advanced systems may try to anticipate or predict the movements of other objects in their environment. Minor errors or miscalculations in route selection in environments shared by other vehicles may result in injury to an occupant of a vehicle involved in a collision, but are more likely to result in property damage. However, in pedestrian environments in which an autonomous vehicle navigates a space shared by human beings on foot, the consequences of even a minor miscalculation could result in serious injury or death. Consequently, there is a need in the art for a self-guidance solution for autonomous vehicles that enables such autonomous vehicles to navigate pedestrian environments safely.

Human beings in interaction with one another have developed a set of non-verbal cues that inform others of intended motions through a shared pedestrian space. Such cues may be culturally influenced and may vary among different human subpopulations. Although imperfect, these cues are valuable in that they are typically understood by human beings and do not require the use of language.

The present application discloses a communicative self-guidance solution for an automaton, such as a robot or other autonomous vehicle, which overcomes the drawbacks and deficiencies in the conventional art. In contrast to conventional solutions that rely exclusively on the self-guiding vehicle to prevent an accident, the present solution engages human pedestrians as participants in collision avoidance. For example, by determining a non-verbal social cue for communicating its own self-guided path forward in a pedestrian environment, a communicative automaton according the present inventive principles enables human pedestrians to anticipate its future movement. Moreover, by detecting changes in the locations and/or travel paths of those human pedestrians in response to the social cue, the present solution enables the communicative automaton to determine whether its self-guided path forward will avoid collisions with human pedestrians. Consequently, the present solution advantageously enables communicative self-guiding automatons to navigate pedestrian environments safely.

SUMMARY

There are provided communicative self-guiding automatons and methods for use by such automatons, substantially as shown in and/or described in connection with at least one of the figures, and as set forth more completely in the claims.

BRIEF DESCRIPTION OF THE DRAWINGS

FIG. 4 shows a flowchart presenting an exemplary method for use by a communicative self-guiding automaton, according to one implementation.

DETAILED DESCRIPTION

Figure 1A:
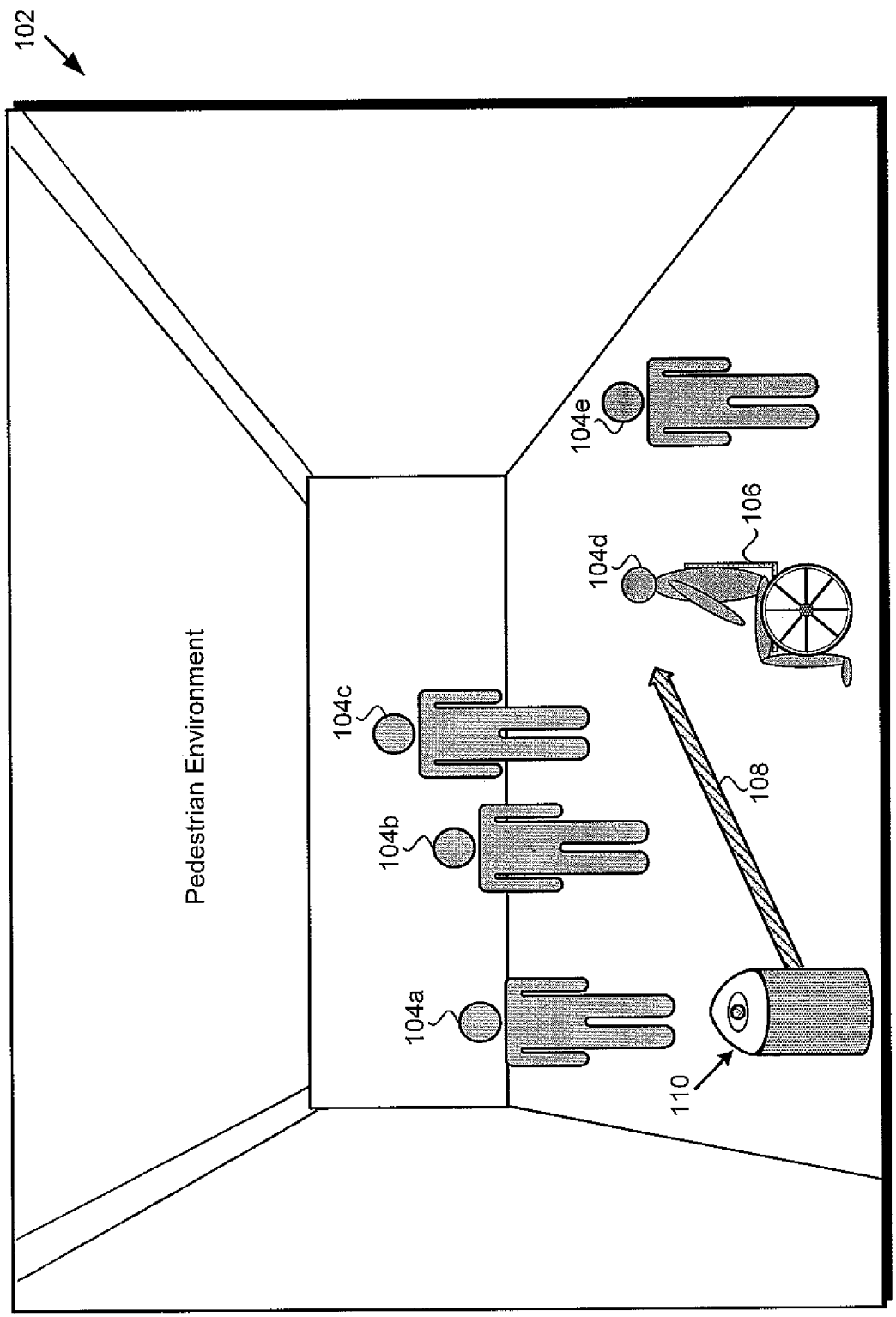
FIG. 1A shows an exemplary implementational environment for a communicative self-guiding automaton, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, autonomous vehicles, such as robots and self-driving cars for example, may analyze their environment to determine safe paths for future motion. Advanced systems may even try to anticipate or predict the movements of other objects in their environment. Minor errors or miscalculations in route selection in environments shared by other vehicles may result in injury to an occupant of a FIG. 1A shows an exemplary implementational environment for a communicative self-guiding automaton, according to one implementation. Pedestrian environment 102, in FIG. 1A, may be part of an indoor or outdoor venue through which human beings 104a, 104b, 104, 104d, and 104e (hereinafter "human beings 104a-104e") move as pedestrians. That is to say, human beings 104a-104e move through pedestrian environment 102 either on foot, or through use of an assistance device, such as wheelchair assistance device 106.

In addition, and as further shown in FIG. 1A, pedestrian environment 102 through which human beings 104a-104e move is concurrently utilized by self-guiding automaton 110, which seeks to identify safe self-guided path forward 108 within pedestrian environment 102. It is noted that, as used in the present application, the expression "safe self-guided path forward" refers to a self-guided route for self-guiding automaton 102 that avoids a collision with any of human beings 104a-104e, taking into consideration each of their respective locations and/or travel paths within pedestrian environment 102.

As noted above, in some implementations, pedestrian environment 102 may be an area within an indoor venue. Examples of such indoor venues include an enclosed sports arena or shopping mall, a hotel, a casino, a hospital, or a school or university building, to name a few. Alternatively, and as also noted above, in some implementations, pedestrian environment 102 may be a portion of an outdoor venue. Examples of such outdoor venues include a pedestrian shopping and dining district, an open air sports arena or shopping mall, a resort property, and a park, again to name merely a few.

Human beings 104a-104e may include male and female adult humans, as well as male and female minor children. Moreover, in some implementations, human beings 104a-

104e may include human toddlers and/or infants. Although the implementation shown in FIG. 1A shows pedestrian environment 102 being utilized by five human beings 104a-104e, that representation is merely exemplary. In some implementations, as few as one human being, or tens, hundreds, or even thousands of human beings may be moving on foot or with assistance, or may be temporarily stationary within pedestrian environment 102.

s shown in FIG. 1A, one or more of human beings 104a-104e may utilize an assistance device corresponding to assistance device 106 as a mobility aid in moving within pedestrian environment 102. It is noted that although assistance device 106 is depicted as a wheelchair in FIG. 1A, that representation is merely exemplary. In other implementations, assistance device 106 may take the form of crutches, a support cane, a cane for the blind, a walker, a motorized scooter, and a non-motorized pedal driven vehicle, such as a bicycle, for example.

As will be described in greater detail below, self-guiding automaton 110 is designed to safely navigate through pedestrian environment 102 concurrently with the presence and/or movement of one or more human beings 104a-104e within pedestrian environment 102. In one implementation, self-guiding automaton 110 does so by detecting at least one of a location and a travel path of each of one or more human beings 104a-104e in pedestrian environment 102, and identifies self-guided path forward 108 based on those locations and and/or travel paths.

Self-guiding automaton 110 then determines a social cue for communicating self-guided path forward 108 to one or more human beings 104a-104e, and detects any change in the locations and/or travel paths of one or more human beings 104a-104e. Self-guiding automaton 110 is further designed to determine a pedestrian safety score of self-guided path forward 108 based on the locations and/or the travel paths, as well as any change in the locations and the travel paths of one or more human beings 104a-104e subsequent to delivery of the social cue. Self-guiding automaton may then move along self-guided path forward 108 if the pedestrian safety score at least satisfies a safety threshold assuring collision avoidance with human beings 104a-104e. It is noted that, according to the exemplary implementation shown in FIG. 1A, self-guiding automaton 110 is designed to safely navigate pedestrian environment 102 using only data obtained or generated by onboard sensors, and using only onboard hardware and software data processing resources.

Figure 1B:
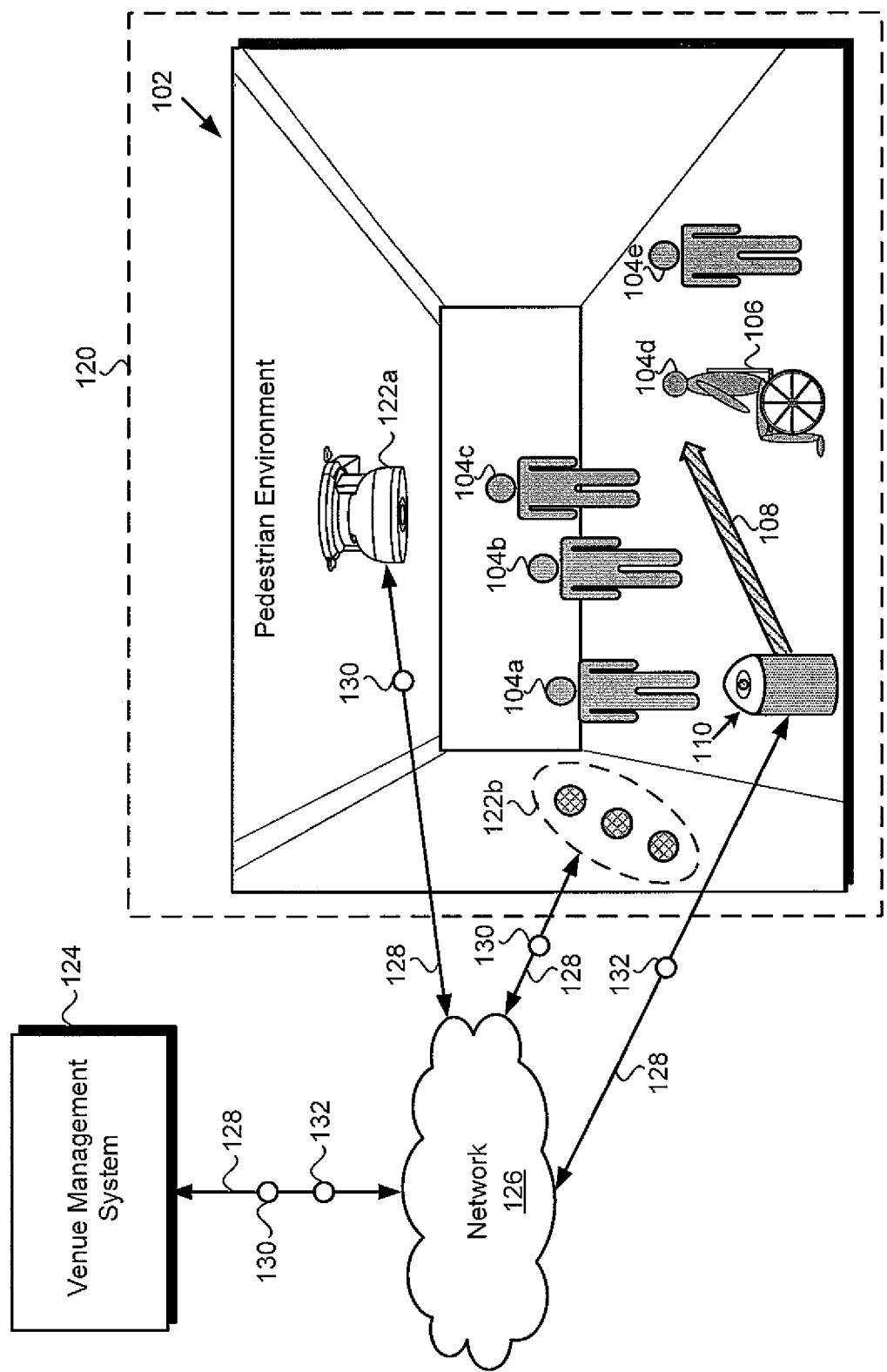
FIG. 1B shows an exemplary implementational environment for a communicative self-guiding automaton, according to another implementation.

FIG. 1B shows an exemplary implementational environment for communicative self-guiding automaton 110, according to another implementation. It is noted that features in FIG. 1B identified by reference numbers identical to those appearing in FIG. 1A correspond respectively to those previously described features and may share any of the characteristics attributed to the corresponding features in the present disclosure. Thus, pedestrian environment 102, one or more human beings 104a-104e, assistance device 106, self-guiding automaton 110, and self-guided path forward 108 may share any of the characteristics described above by reference to FIG. 1A. Also shown in FIG. 1B are venue 120, venue sensors 122a and 122b, venue management system 124, communication network 126, network communication links 128, venue sensor data 130, and pedestrian environment data 132.

Venue 120, of which pedestrian environment 102 is a part, may be an indoor venue such as an enclosed sports arena or shopping mall, a hotel, a casino, a hospital, or a school or university building, for example. Alternatively, in some implementations, venue 120 may be a pedestrian shopping and dining district, an open air sports arena or shopping mall, a resort property, or a park, for example. Venue sensors 122a and 122b may include a variety of different types of sensors for monitoring the number of human beings 104a-104e present in pedestrian environment 102 and the use of assistance device 106 by one or more of human beings 104a-104e, as well as the locations and/or activities of human beings 104a-104e.

As specific examples, venue sensor 122a may be a video or still camera or array of cameras for capturing images enabling monitoring of the occupancy and use of pedestrian environment 102. Venue sensor 122b may be a microphone or array of microphones for capturing sounds enabling monitoring of the occupancy and use of pedestrian environment 102.

According to the exemplary implementation shown in FIG. 1B, venue management system is shown to be interactively coupled to venue sensors 122a and 122b, as well as to self-guiding automaton 110 via communication network 126 and network communication links 128. Venue management system 124 may include one or more computing platforms having hardware and software resources for monitoring venue 120 including pedestrian environment 102, for example by receiving and processing venue sensor data 130. In some implementations, venue management system 124 may correspond to one or more web servers, accessible over communication network 126 in the form of a packet-switched network such as the Internet, for example. Alternatively, venue management system 124 may correspond to one or more computer servers supporting a local area network (LAN), or included in another type of limited distribution network.

As noted above by reference to FIG. 1A, self-guiding automaton 110 is designed to safely navigate through pedestrian environment 102 concurrently with the presence and/or movement of one or more human beings 104a-104e within pedestrian environment 102. In contrast to the implementation shown in FIG. 1A, however, according to the exemplary implementation shown in FIG. 1B, self-guiding automaton 110 may utilize pedestrian environment data 132 provided by venue management system 124, in addition to data obtained or generated by its own onboard sensors, to safely navigate pedestrian environment 102. Alternatively, in some implementations, self-guiding automaton 110 may be in direct wireless communication with venue sensors 122a and/or 122b, may receive venue sensor data 130 directly from venue sensors 122a and/or 122b, and may process venue sensor data 130 using its own onboard hardware and software resources.

Pedestrian environment data 132 may include a variety of different types of data relevant to movement of self-guiding automaton 110 within pedestrian environment 102. For example, pedestrian environment data 132 may include environmental data such as lighting conditions, temperature, and or the presence of precipitation within pedestrian environment 102. In addition, or alternatively, pedestrian environment data 132 may include a head count of human beings within pedestrian environment 102, or venue 120 as a whole, as well as data describing the presence and use of assistance devices corresponding to assistance device 106. In addition, or as yet another alternative, pedestrian environment data 132 may include scheduling data for upcoming events within pedestrian environment 102, or at a location for which pedestrian environment 102 may serve as a travel route, so that self-guiding automaton 110 may anticipate occupancy and use of pedestrian environment 102 by one or more human beings 104a-104e in the near future.

It is emphasized that venue sensor data 130, pedestrian environment data 132, and any data collected through use of onboard sensors of self-guiding automaton 110 does not include personally identifiable information (PII) of any of human beings 104a-104e. Thus, neither self-guiding automaton 110 nor venue management system 124 is configured to obtain information describing the age, gender, race, ethnicity, or any other PII of human beings 104a-104e.

Figure 2:
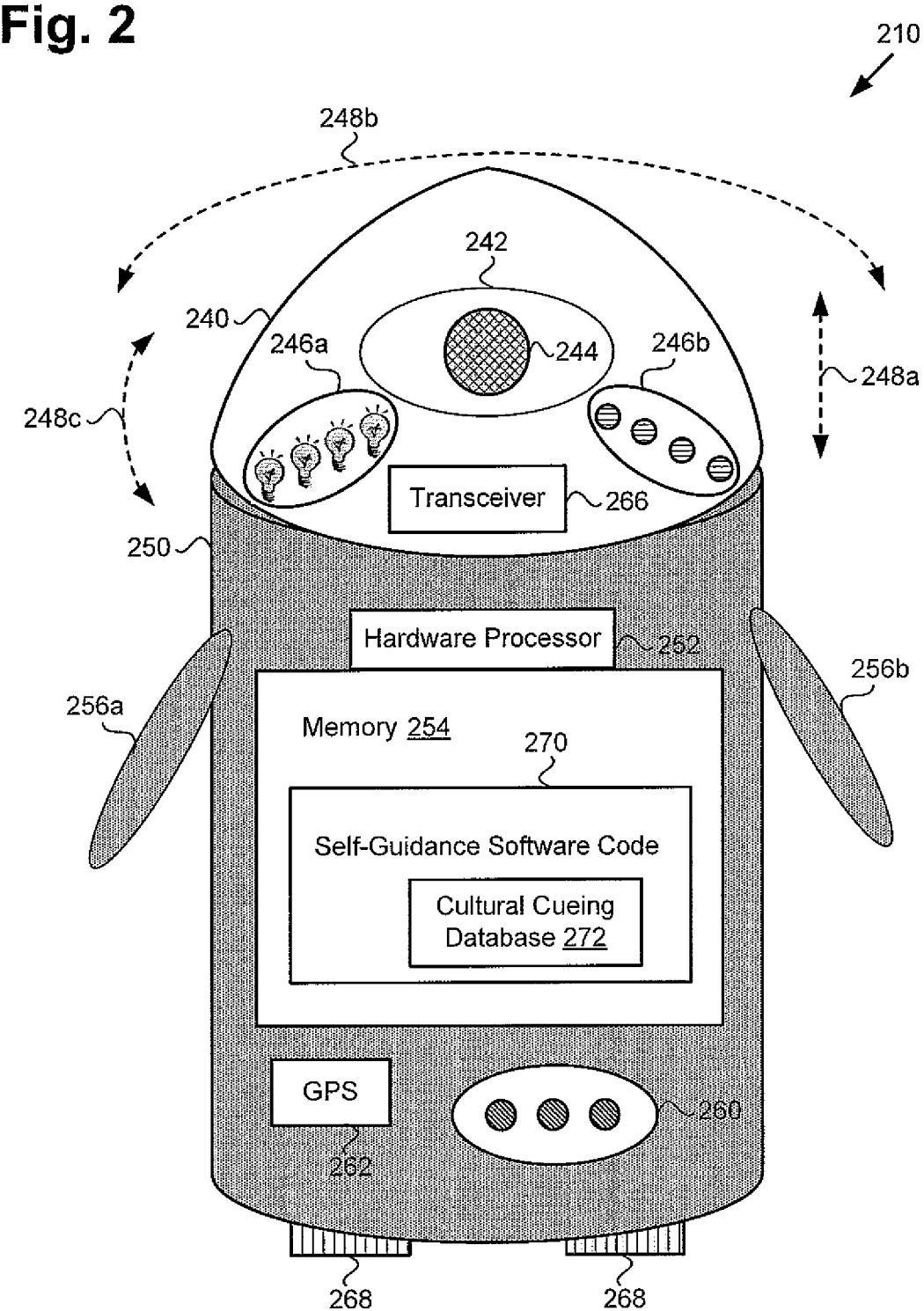
FIG. 2 shows a diagram of an exemplary communicative self-guiding automaton, according to one implementation.

FIG. 2 shows a diagram of an exemplary communicative self-guiding automaton, according to one implementation. Self-guiding automaton 210 includes head 240, body 250, limbs 256a and 256b shown as arms in the exemplary implementation of FIG. 2, and one or more wheels or treads 268. In other words, in some implementations, self-guiding automaton 210 may be a wheeled vehicle, such as a wheeled robot, while in other implementations, self-guiding automaton 210 may be a treaded vehicle, such as a treaded robot. In yet other implementations, self-guiding automaton 210 may take the form of a robot having articulated limbs, such as articulated arms and/or legs for example, enabling the simulation of human or animal movement. Self-guiding automaton 210 corresponds in general to self-guiding automaton 110, in FIGS. 1A and 1B, and those corresponding features can share any of the characteristics attributed to either corresponding feature by the present disclosure.

Head 240 of self-guiding automaton 110/210 includes one or more eye(s) 242 each capable of modifying its shape. Moreover, in some implementations, as shown in FIG. 2, eye(s) 242 may include pupil 244 capable of dilation and contraction. It is noted that eye(s) 242 is/are capable of being directed independently of head 240, and may appear to glance in a particular direction while head 240 remains still. For example, eye(s) 242 may be directed so as to make it appear that eye(s) 242 are glancing to the left, to the right, up, or down. It is further noted that head 240 is capable of movement independent of body 250, and may move up and down as shown by directed line 248a, and/or may turn from side-to-side as shown by directed curve 248b, and/or may tilt as shown by directed curve 248c.

Body 250 of self-guiding automaton 110/210 includes limbs 256a and 246b, which are capable of movements, such as gestures, independent of body 250 and head 240. In addition, body 250 is capable of movement in place, up or down as shown by directed line 248a, from side-to-side as shown by directed curve 248b, or forward and back in a direction substantially perpendicular of the plane of FIG. 2.

Self-guiding automaton 110/210 is designed as a self-guiding mobile computing platform including hardware processor 252, and memory 256 implemented as a non-transitory storage device storing self-guidance software code 270 including cultural cueing database 272. As shown in FIG. 2, self-guiding automaton 110/210 also includes visual output devices 246a, such as one or more lights, audio output devices 246b, such as one or more audio speakers, pedestrian sensors 260, Global Positioning System (GPS) or other location sensor 262, and transceiver 266.

Pedestrian sensors 260 may include multiple sensors for detecting and characterizing the locations, movements, and travel paths of one or more human beings 104a-104e within pedestrian environment 102, as well as the presence and location of objects, such as obstacles or one or more assistance devices corresponding to assistance device 106. Pedestrian sensors 260 may include one or more optical sensors, such as cameras and/or laser scanners. In addition, in some implementations, sensors 260 may include one or more of radio-frequency identification (RFID) sensors, facial recognition sensors, automatic speech recognition (ASR) sensors, and object recognition (OR) sensors, for example.

Figure 3:
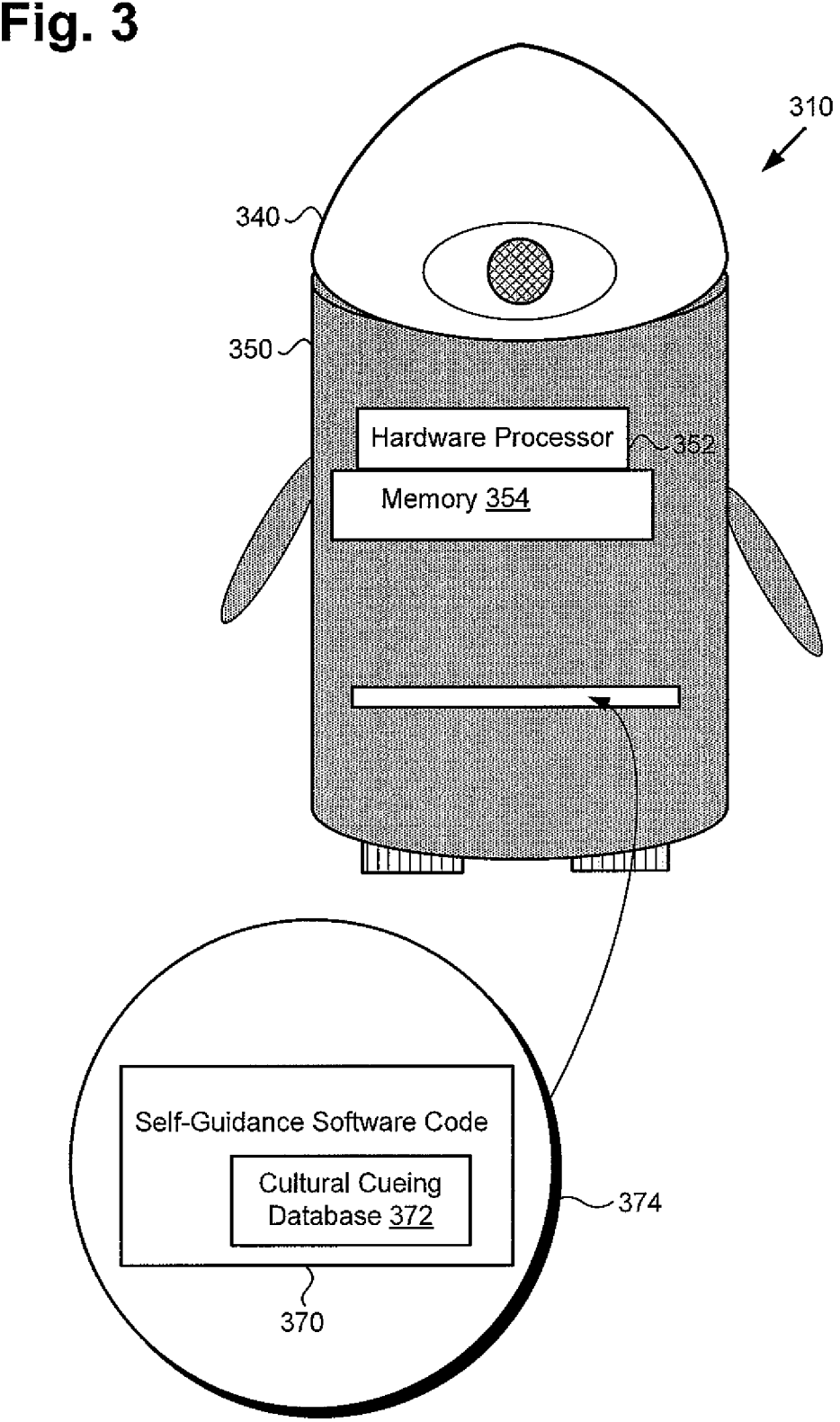
FIG. 3 shows an exemplary automaton and a computer-readable non-transitory medium including instructions for performing communicative self-guidance, according to one implementation.

FIG. 3 shows an exemplary self-guiding automaton and a computer-readable non-transitory medium including instructions for performing communicative self-guidance, according to one implementation. Self-guiding automaton 310 has head 340 and body 350, and includes hardware processor 352 and memory 356. Self-guiding automaton 310 having head 340 and body 350, and including hardware processor 352 and memory 356 corresponds in general to self-guiding automaton 110 and 210, in FIGS. 1A, 1B, and 2. Consequently, self-guiding automaton 310 may share any of the characteristics attributed to self-guiding automaton 110 and 210, and may include any of the features attributed to those corresponding self-guiding automatons by the present disclosure.

Also shown in FIG. 3 is computer-readable non-transitory medium 374 having self-guidance software code 370 including cultural cueing database 372 stored thereon. The expression "computer-readable non-transitory medium," as used in the present application, refers to any medium, excluding a carrier wave or other transitory signal, that provides instructions to hardware processor 252/352 of self-guiding automaton 110/210/310. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 374 provides self-guidance software code 370 including cultural cueing database 372 for execution by hardware processor 252/352 of self-guiding automaton 110/210/310. Self-guidance software code 370 including cultural cueing database 372 corresponds in general to self-guidance software code 270 including cultural cueing database 272, in FIG. 2, and is capable of performing all of the operations attributed to that corresponding feature by the present disclosure.

The functionality of self-guidance software code 270/370 will be further described by reference to FIG. 4 in combination with FIGS. 1A, 1B, 2, and 3. FIG. 4 shows flowchart 480 presenting an exemplary method for use by a communicative self-guiding automaton, such as self-guiding automaton 110/210/310, according to one implementation. With respect to the method outlined in FIG. 4, it is noted that certain details and features have been left out of flowchart 480 in order not to obscure the discussion of the inventive features in the present application.

Flowchart 480 begins with detecting one or both of a location and a travel path of each of one or more human beings 104a-104e in pedestrian environment 102 (action 481). Detection of one or both of a location and a travel path of each of one or more human beings 104a-104e in pedestrian environment 102 may be performed by self-guidance software code 270/370, executed by hardware processor 252/352 of self-guiding automaton 110/210/310, and using pedestrian sensors 260.

As noted above, pedestrian sensors 260 may include one or more optical sensors, such as cameras and/or laser scanners, as well as one or more of RFID sensors, facial recognition sensors, ASR sensors, and OR sensors. As also noted above, pedestrian sensors 260 can serve to detect and characterize the locations, movements, and travel paths of human beings 104a-104e within pedestrian environment 102, as well as the presence and location of objects, such as obstacles or one or more assistance devices corresponding to assistance device 106.

Flowchart 480 continues with identifying self-guided path forward 108 in pedestrian environment 102 based on the location and/or the travel path of each of one or more human beings 104a-104e (action 482). Identification of self-guided path forward 108 in pedestrian environment 102 based on the location and/or the travel path of each of one or more human beings 104a-104e may be performed by self-guidance software code 270/370, executed by hardware processor 252/352 of self-guiding automaton 110/210/310.

It is emphasized that the safety of one or more human beings 104a-104e located in or moving through pedestrian environment 102 concurrently with self-guiding automaton 110/210/310 can be an overriding constraint when identifying self-guided path forward 108. Consequently, self-guiding automaton 110/210/310 may be designed to identify self-guided path forward 108 for avoiding a collision with any of human beings 104a-104e, taking into consideration each of their present locations and/or travel paths within pedestrian environment 102.

Flowchart 480 continues with determining a social cue for communicating self-guided path forward 108 to one or more human beings 104a-104e (action 483). Self-guiding automaton 110/210/310 may employ one or more of several non-verbal social cueing techniques, such as glances and/or gestures, for example, to communicate self-guided path forward 108 identified in action 482. Determination of a social cue for communicating self-guided path forward 108 to one or more human beings 104a-104e may be performed by self-guidance software code 270/370, executed by hardware processor 252/352 of self-guiding automaton 110/210/310.

In one implementation, for instance, a non-verbal social cue for communicating self-guided path forward 108 may include a head motion by self-guiding automaton 110/210/310. Specifically, self-guiding automaton 110/210/310 may move head 240/340 in the direction of self-guided path forward 108. That is to say, self-guiding automaton 110/210/310 may appear to gaze in the direction of self-guided path forward 108. Moreover, in some implementations, the social cue for communicating self-guided path forward 108 may include modifying the shape of eye(s) 242. For example, self-guiding automaton 110/210/310 may modify the shape of eye(s) 242 so as to appear to squint, thereby communicating concentration or displeasure, or may modify the shape of eye(s) 242 through enlargement of eye(s) 242, thereby communicating surprise or excitement.

It is noted that social cues for effectively communicating self-guided path forward 108 to one or more human beings 104a-104e may be culturally sensitive, and may differ by the geographical location of pedestrian environment 102. For example, in the specific implementation described above, an underlying assumption is that glancing in the direction of self-guided path forward 108 will communicate to one or more human beings 104a-104e that self-guiding automaton 110/210/310 intends to move along self-guided path forward 108. However, that assumption may not be valid in all cultural settings. For instance, in some cultures, a glance in a direction away from self-guided path forward 108 may be more effective in ensuring that self-guided path forward 108 remains clear.

It is further noted that detection of the locations and/or travel paths of one or more human beings 104a-104e relative to self-guided path forward 108 may be repeated frequently, such as at a sampling rate of approximately thirty hertz (30 Hz) for example. By contrast, social cues for effectively communicating self-guided path forward 108 to one or more human beings 104a-104e are expressed by self-guiding automaton 110/210/310 at a culturally appropriate rate.

In some implementations, hardware processor 252/352 of self-guiding automaton 110/210/310 may execute self-guidance software code 270/370 to utilize cultural cueing database 272/372 to determine an appropriate social cue for communicating self-guided path forward 108 to one or more human beings 104a-104e based on the geographical location of pedestrian venue 102. For example, self-guidance software code 270/370 may receive location data from GPS or other onboard location sensor 262, and may access cultural cueing database 272/372 to identify an appropriate social cue based on the location data. Alternatively, or in addition, self-guiding automaton 110/210/310 may utilize transceiver 266 to receive location data as part of pedestrian environment data 132 from venue management system 124.

In some implementations, a non-verbal social cue for communicating self-guided path forward 108 may include a body motion by self-guiding automaton 110/210/310. For example, self-guiding automaton 110/210/310 may turn body 250/350 so as to be headed in the direction of self-guided path forward 108. Alternatively, or in addition, in some implementations, the social cue for communicating self-guided path forward 108 may include a gesture by self-guiding automaton 110/210/310 using one or more of limbs 256a and 256b. For example, and depending on the geographical location of pedestrian venue 102, self-guiding automaton 110/210/310 may utilize one or both of limbs 256a and 256b to point or otherwise gesture in the direction of, or away from, self-guided path forward 108.

According to some implementations, self-guiding automaton 110/210/310 may generate multi-component social cues for communicating self-guided path forward 108. For example, self-guiding automaton 110/210/310 may generate a three component social cue including a glance in the direction of self-guided path forward 108 using eye(s) 242, followed by turning or tilting head 240/340 in the direction of self-guided path forward 108, followed by turning body 250/350 in the direction of self-guided path forward 108. Alternatively, or in addition, self-guiding automaton 110/210/310 may generate a four component social cue for communicating self-guided path forward 108. As a specific example, self-guiding automaton 110/210/310 may glance in the direction of self-guided path forward 108 using eye(s) 242, followed by dilation of pupil 244, followed by turning or tilting head 240/340 in the direction of self-guided path forward 108, followed by turning body 250/350 in the direction of self-guided path forward 108.

As noted above, in some implementations dilation or contraction of pupil 244 can be used augment glances by eye(s) 242 in the generation of a social cue for communicating self-guided path forward 108. In the four component social cue described above, for example, dilation of pupil 244 may indicate excitement about what self-guiding automaton 110/210/310 appears to be looking at, and may seem to motivate the turning or tilting of head 240/340 and/or the turning of body 250/350.

Furthermore, in some implementations, self-guiding automaton 110/210/310 may employ one or more of visual output devices 246a and/or audio output devices 246b to draw attention to the social cue for communicating self-guided path forward 108. For example, self-guiding automaton 110/210/310 may illuminate one or more lights 246*a* or generate an alarm using one or more audio speakers 246*b* as an aid in drawing attention to the social cue for communicating self-guided path forward 108. As a specific example, when using one or more lights 246*a* as an aid in drawing attention to the social cue for communicating self-guided path forward 108, self-guiding automaton 110/210/310 may cause one or more lights 246*a* to change color and/or illumination pattern.

Flowchart 480 continues with detecting any change in the location and/or the travel path of each of one or more human beings 104*a*-104*e* in pedestrian environment 102 (action 484). Detection of a change in the location and/or the travel path of each of one or more human beings 104*a*-104*e* in pedestrian environment 102 may be performed by self-guidance software code 270/370, executed by hardware processor 252/352 of self-guiding automaton 110/210/310, and using pedestrian sensors 260, as described above by reference to action 481.

Flowchart 480 continues with determining a pedestrian safety score for self-guided path forward 108 based on one or both of the location and the travel path and any change in the location and/or the travel path of each of one or more human beings 104*a*-104*e* (action 485). Determination of the pedestrian safety score for self-guided path forward 108 may be performed by self-guidance software code 270/370, executed by hardware processor 252/352 of self-guiding automaton 110/210/310.

In some implementations, hardware processor 252/352 of self-guiding automaton 110/210/310 may execute self-guidance software code 270/370 to detect the presence of one or more assistance devices corresponding to assistance device 106 (hereinafter "assistance device(s) 106") used by one or more of human beings 104*a*-104*e* in pedestrian environment 102. In those implementations, hardware processor 252/352 may execute self-guidance software code 270/370 to further determine the pedestrian safety score based on the presence of assistance device(s) 106.

In some implementations, detection of the presence and use of assistance device(s) 106 may be performed by self-guidance software code 270/370 using onboard pedestrian sensors 260 of self-guiding automaton 110/210/310. However, in other implementations, information regarding the presence and use of assistance device(s) 106 in pedestrian environment 102 may be included in pedestrian environment data 132 received by self-guiding automaton 110/210/310 from venue management system 124, or in venue sensor data 130 received directly from venue sensors 122*a* and/or 122*b*.

Flowchart 480 can conclude with moving along self-guided path forward 108 if the pedestrian safety score at least satisfies a safety threshold (action 486). As noted above, the safety of one or more human beings 104*a*-104*e* located in or moving through pedestrian environment 102 can be an overriding constraint on movement by self-guiding automaton 110/210/310. As a result, self-guiding automaton 110/210/310 may be designed to identify self-guided path forward 108 as a safe self-guided path forward for avoiding a collision with any of human beings 104*a*-104*e*. The pedestrian safety score determined in action 485 corresponds to the probability that a collision with any of humane beings 104*a*-104*e* will be avoided during movement along self-guided path forward 106. When that pedestrian safety score is sufficiently high when compared to a predetermined safety threshold, i.e., when the probability of a collision with any of one or more human beings 104*a*-104*e* is sufficiently low, hardware processor 252/352 may execute self-guidance software code 270/370 to move self-guiding automaton 110/210/310 along self-guided path forward 108.

In some implementations, self-guiding automaton 110/210/310 may continue to determine social cues for communicating self-guided path forward 108 while moving along self-guided path forward 108. In the use case described above in which self-guiding automaton 110/210/310 dilates pupil 244 to communicate excitement prior to beginning to move along self-guided path forward 108, movement along self-guided path forward 108 may be accompanied by return of pupil 244 to a neutral size. Moreover, contraction of pupil 244 may be used to communicate annoyance or displeasure if any of one or more human beings 104*a*-104*e* moves unexpectedly to block self-guided path forward 108.

Furthermore, in some implementations, self-guiding automaton 110/210/310 may vary its speed along self-guided path forward 108 as a social cue. For example, self-guiding automaton 110/210/310 may move along self-guided path forward 108 at a relatively rapid speed as long as one or more human beings 104*a*-104*e* remain(s) distant from self-guiding automaton 110/210/310. However, self-guiding automaton 110/210/310 may reduce its speed along self-guided path forward 108 if any of one or more human beings 104*a*-104*e* begins to crowd self-guiding automaton 110/210/310.

Thus, the present application discloses a communicative self-guidance solution for an automaton. In contrast to conventional solutions that rely exclusively on the automaton to prevent an accident, the present solution advantageously engages human pedestrians as participants in collision avoidance. By determining a non-verbal social cue for communicating its own self-guided path forward in a pedestrian environment, a communicative automaton according the present inventive principles enables human pedestrians to anticipate its future movement. Moreover, by detecting changes in the locations and/or travel paths of those human pedestrians in response to the social cue, the present solution enables the communicative automaton to determine whether its self-guided path forward will avoid collisions with human pedestrians. Consequently, the present solution advantageously enables communicative self-guiding automatons to navigate pedestrian environments safely.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A self-guiding automaton comprising:
   one or more sensors;
   a hardware processor and a memory having a self-guidance software code stored therein, the hardware processor configured to execute the self-guidance software code to:
   detect, using the one or more sensors, at least one of a location or a travel path of at least one human being in a pedestrian environment;

identify a self-guided path forward in the pedestrian environment based on the at least one of the location or the travel path of the at least one human being;

determine a social cue for communicating the self-guided path forward to the at least one human being, wherein determining the social cue includes determining a cultural setting of the self-guiding automaton, and obtaining the social cue from a cultural cueing database based on the cultural setting;

perform the social cue to communicate the self-guided path forward to the at least one human being, wherein the social cue includes one or more of a head motion, a body motion, modifying a shape of an eye, or a gesture using a limb by the self-guiding automaton;

detect, using the one or more sensors, a change in the at least one of the location or the travel path of the at least one human being, in response to the social cue;

determine a pedestrian safety score of the self-guided path forward based on the change in the at least one of the location or the travel path of the at least one human being; and move the self-guiding automaton along the self-guided path forward when the pedestrian safety score at least satisfies a safety threshold.

2. The self-guiding automaton of claim 1, wherein the social cue for communicating the self-guided path forward comprises the head motion by the self-guiding automaton.

3. The self-guiding automaton of claim 1, wherein the social cue for communicating the self-guided path forward comprises the body motion by the self-guiding automaton.

4. The self-guiding automaton of claim 1, wherein the social cue for communicating the self-guided path forward comprises modifying the shape of the eye by the self-guiding automaton.

5. The self-guiding automaton of claim 1, wherein the social cue for communicating the self-guided path forward comprises the gesture using the limb by the self-guiding automaton.

6. The self-guiding automaton of claim 1, wherein the hardware processor is further configured to execute the self-guidance software code to:
detect, using the one or more sensors, a presence of an assistance device used by the at least one human being in the pedestrian environment; and
further determine the pedestrian safety score based on the presence of the assistance device.

7. The self-guiding automaton of claim 1, wherein the cultural setting varies based on a geographic location of the pedestrian environment.

8. A method for use by a self-guiding automaton including one or more sensors, a hardware processor, and a system memory having self-guidance software code software code stored therein, the method comprising:
detecting, using the hardware processor and the one or more sensors, at least one of a location or a travel path of at least one human being in a pedestrian environment;
identifying, using the hardware processor, a self-guided path forward in the pedestrian environment based on the at least one of the location or the travel path of the at least one human being;
determining, using the hardware processor, a social cue for communicating the self-guided path forward to the at least one human being, wherein determining the social cue includes determining a cultural setting of the self-guiding automaton, and obtaining the social cue from a cultural cueing database based on the cultural setting;

performing, using the hardware processor, the social cue to communicate the self-guided path forward to the at least one human being, wherein the social cue includes one or more of a head motion, a body motion, modifying a shape of an eye, or a gesture using a limb by the self-guiding automaton;

detecting, using the hardware processor and the one or more sensors, a change in the at least one of the location and the travel path of the at least one human being, in response to the social cue;

determining, using the hardware processor, a pedestrian safety score of the self-guided path forward based on the change in the at least one of the location or the travel path of the at least one human being; and moving, using the hardware processor, the self-guiding automaton along the self-guided path forward when the pedestrian safety score at least satisfies a safety threshold.

9. The method of claim 8, wherein the social cue for communicating the self-guided path forward comprises the head motion by the self-guiding automaton.

10. The method of claim 8, wherein the social cue for communicating the self-guided path forward comprises the body motion by the self-guiding automaton.

11. The method of claim 8, wherein the social cue for communicating the self-guided path forward comprises modifying the shape of the eye by the self-guiding automaton.

12. The method of claim 8, wherein the social cue for communicating the self-guided path forward comprises the gesture using the limb by the self-guiding automaton.

13. The method of claim 8, further comprising:
detecting, using the hardware processor and the one or more sensors, a presence of an assistance device used by the at least one human being in the pedestrian environment; and
further determining, using the hardware processor, the pedestrian safety score based on the presence of the assistance device.

14. The method of claim 8, wherein the cultural setting varies based on a geographic location of the pedestrian environment.

15. A computer-readable non-transitory medium having stored thereon instructions, which when executed by a hardware processor of a self-guiding automaton, instantiate a method comprising:
detecting, using one or more sensors, at least one of a location or a travel path of at least one human being in a pedestrian environment;
identifying a self-guided path forward in the pedestrian environment based on the at least one of the location or the travel path of the at least one human being;
determining a social cue for communicating the self-guided path forward to the at least one human being, wherein determining the social cue includes determining a cultural setting of the self-guiding automaton, and obtaining the social cue from a cultural cueing database based on the cultural setting;
performing the social cue to communicate the self-guided path forward to the at least one human being, wherein the social cue includes one or more of a head motion, a body motion, modifying a shape of an eye, or a gesture using a limb by the self-guiding automaton;

detecting, using the one or more sensors, a change in the at least one of the location or the travel path of the at least one human being, in response to the social cue;

determining a pedestrian safety score of the self-guided path forward based on the change in the at least one of the location or the travel path of the at least one human being; and moving the self-guiding automaton along the self-guided path forward when the pedestrian safety score at least satisfies a safety threshold.

16. The computer-readable non-transitory medium of claim 15, wherein the method further comprises:

detecting a presence of an assistance device used by the at least one human being in the pedestrian environment; and further determining the pedestrian safety score based on the presence of the assistance device.

17. The computer-readable non-transitory medium of claim 15, wherein the cultural setting varies based on a geographic location of the pedestrian environment.

18. The computer-readable non-transitory medium of claim 15, wherein the social cue for communicating the self-guided path forward comprises the head motion by the self-guiding automaton.

19. The computer-readable non-transitory medium of claim 15, wherein the social cue for communicating the self-guided path forward comprises the body motion by the self-guiding automaton.

20. The computer-readable non-transitory medium of claim 15, wherein the social cue for communicating the self-guided path forward comprises the gesture using the limb by the self-guiding automaton.

* * * * *